Sept. 10, 1968     C. G. MATSON     3,400,948
TRAILER LOAD-TRANSFERRING AND ANTISWAY HITCH
Filed Jan. 9, 1967
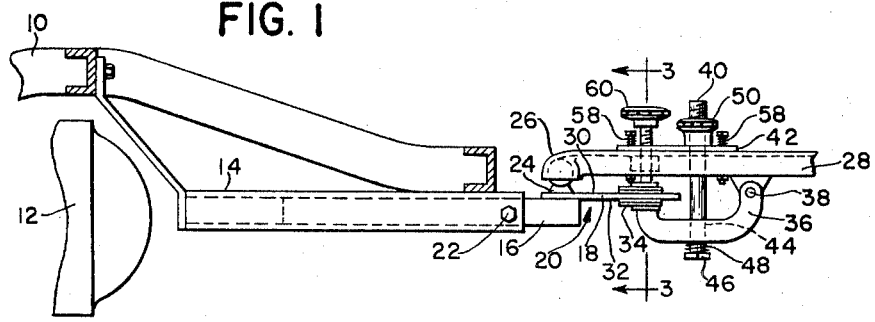
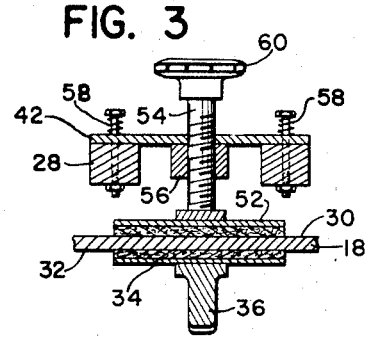
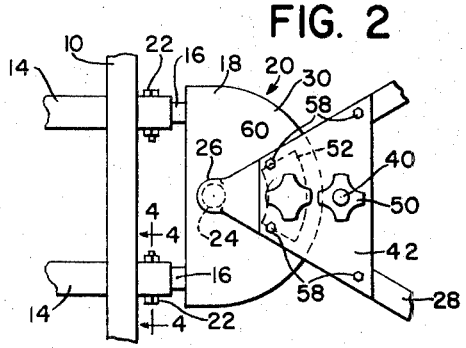
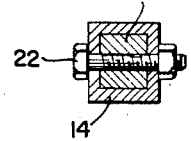
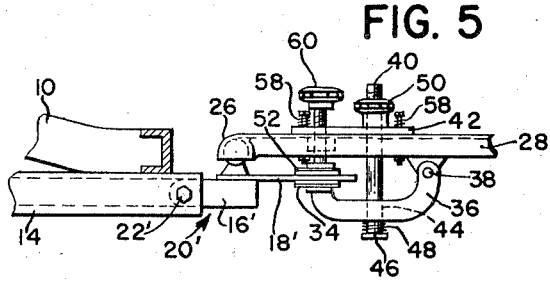
INVENTOR.
C. G. MATSON

United States Patent Office 3,400,948
Patented Sept. 10, 1968

3,400,948
TRAILER LOAD-TRANSFERRING AND ANTISWAY HITCH
Carl G. Matson, 401 E. Central Blvd., Kewanee, Ill. 61443
Filed Jan. 9, 1967, Ser. No. 608,086
2 Claims. (Cl. 280—406)

ABSTRACT OF THE DISCLOSURE

A hitch for connecting a trailer to an automobile or like draft vehicle and having cooperatively engageable parts for applying an adjustable lifting force to the rear of the draft vehicle and further having means for applying a braking force for inhibiting relative swinging of the trailer about a vertical axis.

Background of the invention

Designers and builders of hitches for use in connecting trailers to automobiles and the like have been long familiar with levelers and weight-transfer devices that operate to apply a lifting force to the trailer tongue so as to level the trailer and car by transferring some portion of the trailer weight to the front of the car and thus allowing the rear springs of the car to raise the rear hitch point. Most of these devices are quite complicated and expensive and very few of them are combined with means to inhibit lateral sway of the trailer and those means that do function as antisway means are far from being simple and inexpensive because they involve cams, torsion bars, shock absorbers and other complex mechanisms.

Summary of the invention

The invention overcomes the above problems by the provision of a simple, low-cost mechanism embodying cooperative members having brake faces and utilizing vertical leveling forces to cause the brake faces to inter-engage and thus to inhibit whipping or lateral sway of the trailer. The invention further features a secondary brake means that can be selectively used with the brake means that functions as the leveling means. The hitch part that provides the tongue support is easily attachable to and detachable from the car. The arrangement is also such that the tongue support may be rigidly attached to the car or may be interchanged with a tongue support that is relatively pivotal about a transverse axis.

Brief description of the drawings

FIGURE 1 is a fragmentary side elevation showing the hitch between a trailer and an automobile;
FIGURE 2 is a fragmentary plan view of the structure of FIGURE 1;
FIGURE 3 is an enlarged section on the line 3—3 of FIGURE 1;
FIGURE 4 is an enlarged section on the line 4—4 of FIGURE 2; and
FIGURE 5 is a view similar to FIGURE 1 but showing a different form of tongue support.

Description of the preferred embodiments

The rear part of a frame 10 of a typical automobile is shown in FIGURE 1 as extending above and to the rear of an axle housing 12 on which the frame may be supported by any conventional spring system (not shown). A pair of elongated fore-and-aft tubular members 14 are rigidly attached in any suitable manner to the frame 10 and project rearwardly to telescopically removably receive a pair of hitch bars 16 that are welded or otherwise rigidly secured to a semicircular plate-like element 18.

The bars 16 and element 18 together provide a tongue support 20 detachably secured to the tubular members 14 as by pins or bolts 22.

A hitch ball 24 is rigid on the element 18 at the center of its semicircular shape and receives a typically socketed front end portion 26 of a tongue 28 of a conventional two-wheeled trailer. A portion of the trailer weight is therefore imposed on the tongue support 20 and thus on the rear end of the car, and the ball and socket connection 24–26 affords the customary universally pivotal connection that includes of course both vertical and transverse axes.

The element 18 lies in vertically spaced relation to the fore part of the tongue 28 and, being of plate-like nature, provides upper and lower brake surfaces 30 and 32. The semicircular shape of the element 18 enables it to accommodate 180° of swinging of the tongue 28 about the vertical axis of the pivot 24–26.

When the tongue 28 is first hitched to the tongue support 20, part of the weight of the trailer, if substantial, will depress the rear springs of the car and of course the trailer will tilt downwardly and forwardly at the transverse axis through the ball and socket 24–26. However, the vehicles can be readily leveled by applying a lifting force to the tongue support 20. This is done here by means that also functions as an antisway brake, specifically including a lower brake shoe 34 secured to the forward end of a generally U-shaped arm 36 that has its rear end pivoted at 38 to the tongue 28 rearwardly of the rear edge of the tongue support element 18. The means for applying both lifting and braking forces to the tongue support includes a threaded draw member 40 passed vertically through an apertured tongue-mounted upper plate 42 and loosely through an opening 44 in the arm 36, having a lower headed end 46 between which and the arm is a coiled compression spring 48. An internally threaded hand wheel 50 fits the threaded upper end of the member 40 and engages the tope of the plate 42 for applying an adjustable upward force to the element that not only levels the vehicle but also presses the brake shoe 34 into engagement with the element lower brake surface 32.

To augment the braking effect, a second brake means is provided, comprising an upper brake shoe 52 fixed to the lower end of a screw member 54 that is threaded into a nut 56 welded to the underside of the plate 42. This plate is spring-mounted to the tongue 28 in any suitable manner as at 58, and the upper end of the member 54 rigidly carries a hand wheel 60 to facilitate manipulation. Although the hitch is designed primarily for towing over level highways, the combination of the spring mounting at 48 and 58 with the resiliency of the elements 18, which may be of spring steel, accommodates both torsional and bending forces between the vehicles respectively about fore-and-aft and transverse axes through the ball and socket 24–26 as the vehicular train experiences curves, hills, etc.

FIGURE 5 shows a construction in which the tongue support 20 is replaced by a counterpart 20' having hitch bars 16' welded to a plate 18' like the element 18 to provide a tongue support 20', but in this case the bars 16' are pivotally connected to the tubular members 14 by hitch pins 22' coaxial on a transverse axis. A hitch of this type would be used with a lightweight trailer where leveling is not significant. In such case, the brake shoes 34 and 52 function only as brakes.

As previously described, the brake means may be used together or individually, depending upon the degree of braking action required. The overall arrangement is characterized primarily by simplicity and low cost, is easy to operate and adjust and readily adapts itself to conventional vehicles. Features beyond those listed, as well as modifications in the preferred structures, will occur to those versed in the art.

I claim:

1. In a hitch for connecting the tongue of a trailer to a draft vehicle, the improvement comprising a tongue support having mounting means for attachment to the draft vehicle and including a tongue supporting pivot enabling relative swinging of the tongue about both transverse and vertical axes, said support including as a rigid part thereof a plate-like element extending rearwardly of the pivot and in vertically spaced relation to the tongue and presenting upper and lower flat horizontal brake surfaces, a first brake shoe, means mounting the shoe on the tongue for selective engagement with and disengagement from said upper surface for controlling relative swinging of the tongue about the vertical axis, and a second brake shoe adjustably carried by the tongue for engagement with said lower surface.

2. The invention defined in claim 1, in which said element is spaced below the tongue, said second brake shoe is below and engageable with said surface, and the means mounting the second shoe on the tongue includes an arm connected to the second shoe and rockably engaging the tongue and a draw member operative between the tongue and arm for drawing said arm upwardly to increase engagement of the second shoe with said lower surface.

References Cited

UNITED STATES PATENTS

| | | | |
|---|---|---|---|
| 2,940,776 | 6/1960 | Curtis | 280—446 |
| 3,297,340 | 1/1967 | Rendessy | 280—432 |
| 3,328,051 | 6/1967 | Hope et al. | 280—432 |
| 3,347,561 | 10/1967 | Hedgepeth | 280—446 |

FOREIGN PATENTS

| | | |
|---|---|---|
| 648,623 | 8/1937 | Germany. |
| 47,654 | 1/1940 | Netherlands. |

LEO FRIAGLIA, *Primary Examiner.*